US009986507B2

(12) United States Patent
Viswanadham et al.

(10) Patent No.: US 9,986,507 B2
(45) Date of Patent: *May 29, 2018

(54) SHORT-RANGE WIRELESS CONTROLLER FILTERING AND REPORTING

(71) Applicant: GOOGLE LLC, Mountain View, CA (US)

(72) Inventors: Prerepa V. Viswanadham, Fremont, CA (US); Wei Wang, San Carlos, CA (US); Meghan Desai, Mountain View, CA (US)

(73) Assignee: Google LLC, Mountain View, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/146,088

(22) Filed: May 4, 2016

(65) Prior Publication Data

US 2016/0249292 A1  Aug. 25, 2016

Related U.S. Application Data

(63) Continuation of application No. 14/508,769, filed on Oct. 7, 2014, now Pat. No. 9,357,342.

(51) Int. Cl.
*H04W 52/02* (2009.01)
*H04W 4/00* (2018.01)
(Continued)

(52) U.S. Cl.
CPC ..... *H04W 52/0229* (2013.01); *H04L 12/1886* (2013.01); *H04L 45/7457* (2013.01);
(Continued)

(58) Field of Classification Search
CPC .............................. H04W 4/008; H04W 4/206
See application file for complete search history.

(56) References Cited

U.S. PATENT DOCUMENTS 7,209,771 B2   4/2007   Twitchell, Jr.
7,653,017 B2   1/2010   Huylebroeck
(Continued)

OTHER PUBLICATIONS

McMains, Sean, iBeacons: Lessons Learned, Mutual Mobile, Jul. 30, 2014, available at http://www.mutualmobile.com/posts/ibeacons-lessons-learned.
(Continued)

*Primary Examiner* — Tuan H Nguyen
(74) *Attorney, Agent, or Firm* — McDonnell Boehnen Hulbert & Berghoff LLP

(57) ABSTRACT

Methods and systems for filter data packets using an advertising data packet content filter are disclosed. An example method involves maintaining, by a Bluetooth device, an advertising data content filter. The advertising data content filter includes at least one content filter having at least one respective delivery mode that specifies when to deliver data packets matching the at least one content filter to a host Bluetooth stack. The method also involves receiving, by the Bluetooth device, a data packet from an advertising Bluetooth device. The method further involves determining, by the Bluetooth device, that content of the data packet matches a particular content filter of the advertising data content filter. And the method involves providing a portion of the data packet to the host Bluetooth stack in accordance with a particular delivery mode corresponding to the particular content filter.

20 Claims, 8 Drawing Sheets

(51) Int. Cl.
   H04W 76/02      (2009.01)
   H04L 12/18      (2006.01)
   H04L 12/743     (2013.01)
   H04W 4/20       (2018.01)
   H04W 48/10      (2009.01)
   H04B 7/26       (2006.01)

(52) U.S. Cl.
   CPC .......... *H04W 4/008* (2013.01); *H04W 4/206* (2013.01); *H04W 48/10* (2013.01); *H04W 76/02* (2013.01); *H04B 7/2621* (2013.01); *Y02B 60/50* (2013.01)

(56) References Cited

U.S. PATENT DOCUMENTS

| | | | |
|---|---|---|---|
| 7,961,659 B2 * | 6/2011 | Zaks | H04W 52/0229 370/311 |
| 8,437,776 B2 | 5/2013 | Busch | |
| 8,554,141 B2 | 10/2013 | Desai et al. | |
| 8,737,919 B2 | 5/2014 | Kim | |
| 2002/0102988 A1 | 8/2002 | Myllymaki | |
| 2007/0281716 A1 | 12/2007 | Altman et al. | |
| 2013/0090061 A1 | 4/2013 | Linde | |
| 2013/0165044 A1 | 6/2013 | Xie et al. | |
| 2013/0237243 A1 | 9/2013 | Kuehnel et al. | |
| 2014/0086125 A1 * | 3/2014 | Polo | H04W 52/0229 370/311 |
| 2014/0094198 A1 | 4/2014 | Heo et al. | |

OTHER PUBLICATIONS

Davis et al., "From Context to Content: Leveraging Context to Infer Media Metadata", MM'04, Oct. 10-14, 2004.
Davis, "MMM2: Mobile Media Metadata for Media Sharing", Extended Abstracts of the Conference on Human Factors in Computing Systems (CHI 2005) in Portland, Oregon, ACM Press, 1335-1338, 2005.
Davis et al., "Using Context and Similarity for Face and Location Identification", Proceedings of SPIE, vol. 6061, Jan. 15, 2006.
Liu et al., "Extracting Semantic Location from Outdoor Positioning Systems", Proceedings of the 7th International Conference on Mobile Data Management (MDM) 2006.
Smith, "Social-Mobile Applications", Invisible Computing, Computer, Apr. 2005, pp. 84-85.
Patterson et al., "Nomatic: Location by, for, and of Crowds", LoCA 2006, LNCS 3987, pp. 186-203, 2006.
Sarvas et al., "Metadata Creation System for Mobile Images", MobiSys'04, Jun. 6-9, 2004, Boston, Massachusetts, USA.
Smith et al., "Social Disclosure of Place: From Location Technology to Communication Practices", Pervasive Computing, 2005, LNCS vol. 3468, pp. 134-151, 2005.
Wilhelm et al., "Photo Annotation on a Camera Phone", CHI 2004, Apr. 24-29, 2004, Vienna, Austria, pp. 1403-1406.
Yohsino et al., "Namba: Location-Aware Collaboration System for Shopping and Meeting", IEEE Transaction on Consumer Electronics, vol. 48, No. 3, Aug. 2002, pp. 470-477.
Iachello et al., "Control, Deception, and Communication: Evaluating the Deployment of a Location-Enhanced Messaging Service", UbiComp 2005, LNCS 3660, pp. 213-231, 2005.
Iachello et al., "Developing Privacy Guidelines for Social Location Disclosure Applications and Services", Symposium onUsable Privacy and Security (SOUPS) 2005, Jul. 6-8, 2005, Pittsburgh, PA, USA.

* cited by examiner

| Filter Index | Feature 1 | Feature 2 (Optional) | Logic Type |
|---|---|---|---|
| 1 | Broadcaster Address | - | N/A |
| 2 | Local Name | - | N/A |
| 3 | Service UUID | - | N/A |
| 4 | Service Solicitation UUID | - | N/A |
| 5 | Service Solicitation UUID | Local Name | AND |
| 5 | Local Name | Manufacturer Data | OR |
| 7 | Manufacturer Data | Service Data | AND |
| 8 | Service Data | Local Name | OR |

FIGURE 5

SHORT-RANGE WIRELESS CONTROLLER FILTERING AND REPORTING

CROSS REFERENCE TO RELATED APPLICATION

The present disclosure is a continuation of U.S. patent application Ser. No. 14/508,769, filed on Oct. 7, 2014, the entirety of which is herein incorporated by reference.

BACKGROUND

Unless otherwise indicated herein, the materials described in this section are not prior art to the claims in this application and are not admitted to be prior art by inclusion in this section.

Portable computing devices such as personal computers, laptop computers, tablet computers, smart phones, wearable computers, and countless types of Internet-capable devices are prevalent in numerous aspects of modern life. For example, it is common for a single consumer to operate a smart phone, a laptop computer, a keyboard, and a mouse, possibly simultaneously. With increasing consumers of multiple portable devices, the demand for wireless technology continues to play a role in the use of such portable devices. As such, various forms of wireless technology have evolved to locally connect these portable devices for numerous applications. One short-range wireless technology standard for exchanging data between multiple portable devices is popularly known as Bluetooth.

Bluetooth is commonly used for wirelessly connecting a portable device with one or more other portable devices over a short range. For example, Bluetooth may be used to connect a cell phone to a wireless headset, possibly allowing for hands-free use of the phone. In some instances, Bluetooth may also be used to connect the cell phone to the audio speakers and a microphone of a motor vehicle, possibly allowing for hands-free use of the phone while operating the vehicle. In multiple applications, Bluetooth remains particularly attractive due to its low-cost solutions and protocols designed for low power consumption.

Bluetooth low energy (Bluetooth LE or BLE, sometimes referred to as Bluetooth Smart) is an extension of the Bluetooth standard that was merged into the Bluetooth standard in 2010. The BLE standard also enables radio frequency communication between various types of devices, and is aimed at novel applications in the healthcare, fitness, security, and home entertainment industries. As the name implies, the BLE standard is intended to provide considerably reduced power consumption and cost as compared to the original Bluetooth standard. For example, the BLE standard is designed to enable wireless connectivity with small devices running on a watch battery or button cell.

One particular portion of the BLE standard is the advertiser/scanner model that allows a device to discover nearby devices, broadcast information for discovery by nearby devices, or form a connection with another device. The BLE standard provides for forty physical channels operating within the 2.4 GHz Industrial, Scientific, & Medical (ISM) band. Three of the channels are designated for use as advertising channels, while the remaining thirty-seven channels are designated for use as data channels. Bluetooth devices may transmit and receive data in packets on the advertising channels using a Frequency Division Multiple Access (FDMA) scheme. Devices that transmit data packets on the advertising channels are referred to as "advertisers". And devices that receive data packets on the channels are referred to as "scanners".

SUMMARY

Embodiments of the present disclosure are related to systems and methods for filtering and reporting data packets that are received by a device from an advertising short-range wireless communication (e.g., Bluetooth) device. For example, embodiments of the present disclosure may allow a device to configure a Bluetooth controller to autonomously filter received data packets (e.g., advertising packets and/or scan response packets) and report filtered data packets to a host Bluetooth stack using one or more predetermined delivery modes. In some examples, the Bluetooth controller may filter data packets received in one or more advertising channels without waking up a host processor of the device that implements the host Bluetooth stack, thereby conserving battery power and improving performance.

In one example aspect, a method is provided that involves maintaining, by a Bluetooth device, an advertising data content filter. The advertising data content filter includes at least one content filter having at least one respective delivery mode that specifies when to deliver data packets matching the at least one content filter to a host Bluetooth stack. The method also involves receiving, by the Bluetooth device, a data packet from an advertising Bluetooth device. The method further involves determining, by the Bluetooth device, that content of the data packet matches a particular content filter of the advertising data content filter. And the method involves providing a portion of the data packet to the host Bluetooth stack in accordance with a particular delivery mode corresponding to the particular content filter.

In another example aspect, a Bluetooth device that includes one or more processors and a computer-readable medium is provided. The computer-readable medium is configured to store instructions, that when executed by the one or more processors, cause the Bluetooth device to perform functions. The functions involve maintaining an advertising data content filter. The advertising data content filter includes at least one content filter having at least one respective delivery mode that specifies when to deliver data packets matching the at least one content filter to a host Bluetooth stack. The functions also involve receiving a data packet from an advertising Bluetooth device, and determining that content of the data packet matches a particular content filter of the advertising data content filter. Further, the functions involve providing a portion of the data packet to the host Bluetooth stack in accordance with a particular delivery mode corresponding to the particular content filter.

In still another example aspect, a non-transitory computer-readable medium having stored therein instructions, that when executed by one or more processors of a Bluetooth device, cause the Bluetooth device to perform functions is provided. The functions involve maintaining an advertising data content filter. The advertising data content filter includes at least one content filter having at least one respective delivery mode that specifies when to deliver data packets matching the at least one content filter to a host Bluetooth stack. The functions also involve receiving a data packet from an advertising Bluetooth device, and determining that content of the data packet matches a particular content filter of the advertising data content filter. Further, the functions involve providing a portion of the data packet to the host Bluetooth stack in accordance with a particular delivery mode corresponding to the particular content filter.

In yet another example aspect, a Bluetooth device is provided that comprises means for maintaining an advertising data content filter. The advertising data content filter includes at least one content filter having at least one respective delivery mode that specifies when to deliver data packets matching the at least one content filter to a host Bluetooth stack. The Bluetooth device also includes means for receiving a data packet from an advertising Bluetooth device, and means for determining that content of the data packet matches a particular content filter of the advertising data content filter. Further, the Bluetooth device includes means for providing a portion of the data packet to the host Bluetooth stack in accordance with a particular delivery mode corresponding to the particular content filter.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is a table of example content filters.

DETAILED DESCRIPTION

Figure 1:
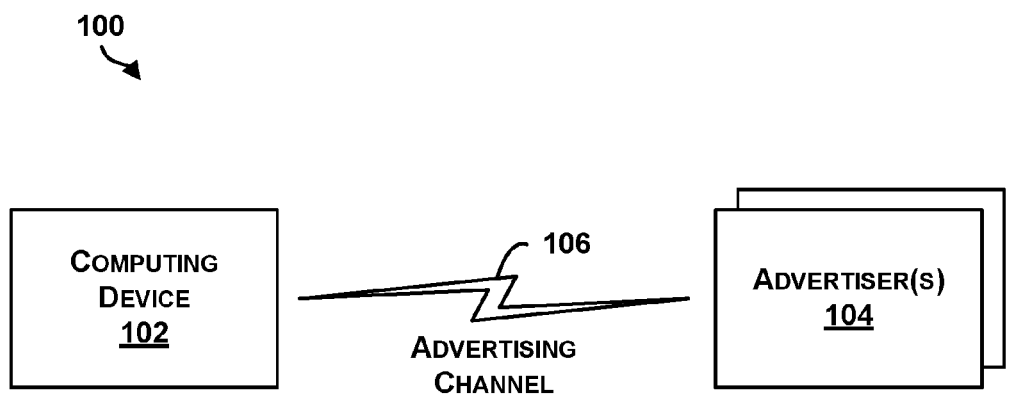
FIG. 1 illustrates an example wireless communication system.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for filtering and reporting data packets that are received by a device from an advertising short-range wireless communication (e.g., Bluetooth) device. For example, embodiments of the present disclosure may allow a device to configure a Bluetooth controller to autonomously filter received data packets and report filtered data packets to a host Bluetooth stack using one or more predetermined delivery modes. One example of a data packet is an advertising packet transmitted on an advertising channel by an advertiser as described in the BLE protocol. Another example of a data packet in the context of the BLE protocol is a scan response packet transmitted by an advertiser in response to receiving a scan request from a device. In some examples, the Bluetooth controller may filter data packets received in one or more advertising channels without waking up a host processor of the device which implements the host Bluetooth stack, thereby conserving battery power and improving performance.

According to an example method, a Bluetooth device may maintain an advertising data content filter. The advertising data content filter may include at least one content filter that the Bluetooth device may use to filter content of a received data packet. For instance, the advertising data content filter may include a local name content filter with which a Bluetooth controller may filter a received data packet based on the local name contained within the data packet. As another example, the advertising data content filter may include a service universally unique identifier (UUID) content filter with which the Bluetooth controller may filter a received data packet based on the service UUID contained within the data packet. Various additional example content filters are discussed herein.

Further, each content filter of the advertising data content filter may correspond to a particular delivery mode that specifies when the Bluetooth device should deliver data packets (or portions of data packets) matching the content filter to a host Bluetooth stack. For example, a content filter may correspond to an immediate delivery mode in which received data packets matching the content filter are immediately delivered to the host Bluetooth stack. In such an example, if a data packet matching the first content filter is received and a host processor which implements the host Bluetooth stack is in a sleep mode or idle mode, the Bluetooth controller may wake up the host processor. As another example, a content filter may correspond to a batching delivery mode in which the received data packets matching the content filter are stored in a memory of the Bluetooth controller. In such an example, if a data packet matching the content filter is received and the host processor of the device is in a sleep mode or idle mode, the host processor may remain in the idle or sleep mode and the Bluetooth controller may store the data packet in the memory without waking up the host processor. As still another example, a content filter may correspond to a verification delivery mode in which received data packets matching the content filter are delivered to the host Bluetooth stack upon expiration of a timeout period and verification of a presence of the advertising Bluetooth device.

Further in accordance with the example method, the Bluetooth controller may receive a data packet, such as an advertising packet or a scan response packet. The Bluetooth controller may then determine that content of the data packet matches a particular content filter of the advertising data content filter, and provide at least a portion of the data packet to a host Bluetooth stack in accordance with a particular delivery mode corresponding to the particular content filter.

As described herein, the host Bluetooth stack may configure the advertising data content filter by providing one or more commands to the Bluetooth controller. For instance, a host processor may use a plurality of predetermined operating codes to configure parameters of the advertising data content filter and then allow the Bluetooth controller to carry out the filtering of received data packets independently of the host processor. Advantageously, this may allow the Bluetooth controller to carry out filtering of data packets while the host processor is in a sleep or idle mode, which may help to conserve power.

Furthermore, the ability to configure multiple content filters having different delivery modes may allow different applications operating on the device to concurrently have direct reporting of received data packets as well as batching of results in a memory of the Bluetooth controller. For instance, a first application may configure a first content filter having a batch scanning mode in which data packets matching the first content filter are stored in a memory of the Bluetooth controller. Meanwhile, a second application may simultaneously configure a second content filter having an immediate delivery mode in which data packets matching the second filter are directly reported to the host Bluetooth stack upon receipt. Various additional example implementations of the methods and systems are described below with reference to the figures.

Additionally, although portions of the present disclosure focus on the BLE protocol to help illustrate features of the methods and systems, the examples are not meant to be limiting. Those of ordinary skill in the art will readily appreciate that the disclosed principles can be applied as well in other types of short-range wireless communication systems, with variations where appropriate. For instance, the described methods and systems may be applicable to other short-range wireless communication systems in which advertising devices broadcast data packets for receipt by a device having a short-range wireless communication module and host stack.

Referring now to the figures, FIG. 1 illustrates an example wireless communication system 100. As shown in FIG. 1, the wireless communication system 100 includes a computing device 102 and one or more advertisers 104 that may communicate with the computing device over an advertising channel 106. In one example, the wireless communication system 100 may be a BLE system operable to utilize an FDMA scheme and a time division multiple access (TDMA) scheme to support voice and/or data communication. For example, the wireless communication system 100 can be configured to divide a plurality of physical channels, for example, forty physical channels, into advertising channels and data channels per FDMA scheme. In advertising channels, a BLE device, such as the computing device 100 or an advertiser 104, can then function as an advertiser, scanner, and/or initiator. In data channels, a BLE device can play a role as a master or a slave. For instance, the BLE system can be enabled to utilize a TDMA based polling scheme in link layer communications between a master device and a slave device.

An advertiser, such as the advertiser 104, can comprise any device acting in an advertiser role according to the BLE standard or another related short-range wireless communication standard. For example, advertiser 104 may be a device with temperature sensors that broadcasts temperature data that can be received and read by a device within communication range of the advertiser 104. As another example, advertiser 104 may be a device that broadcasts product or promotional information to scanner devices in a retail establishment. Accordingly, advertiser 104 can include suitable logic, circuitry, and/or code that can be enabled to broadcast advertisement packets periodically in advertising channels, such as the advertising channel 106. Advertiser 104 may be configured to advertise service and/or availability for a link layer connection. For instance, advertiser 104 may be configured to transmit advertising packets within advertising events in accordance with the BLE protocol.

The computing device 102 may be any type of device acting in a scanner role according to the BLE standard or another related short-range wireless communication standard. For instance, the computing device may be a scanner device operable to search for advertising packets from BLE advertisers, such as advertiser 104. By way of example, the computing device 102 may be mobile phone, desktop computer, laptop computer, tablet computer, wearable computer, or other type of computing device configured to scan for advertising packets. Accordingly, computing device 102 may include suitable logic, circuitry, and/or code that may be operable to search for advertising packets from advertising BLE devices.

Further, computing device 102 may be configured to perform a passive scan or an active scan. In a passive scan, the computing device 102 may be enabled to listen for advertising packets and may not transmit messages to advertisers. On the other hand, in an active scan, the computing device 102 may request an advertiser to transmit additional information that may not be available in the received advertising packets. For instance, in accordance with the BLE standard, the computing device 102 may transmit a scan request packet to a BLE advertiser. In response to receiving the scan request packet, the BLE advertiser may then respond by transmitting a scan response packet to the computing device 102.

Figure 2:
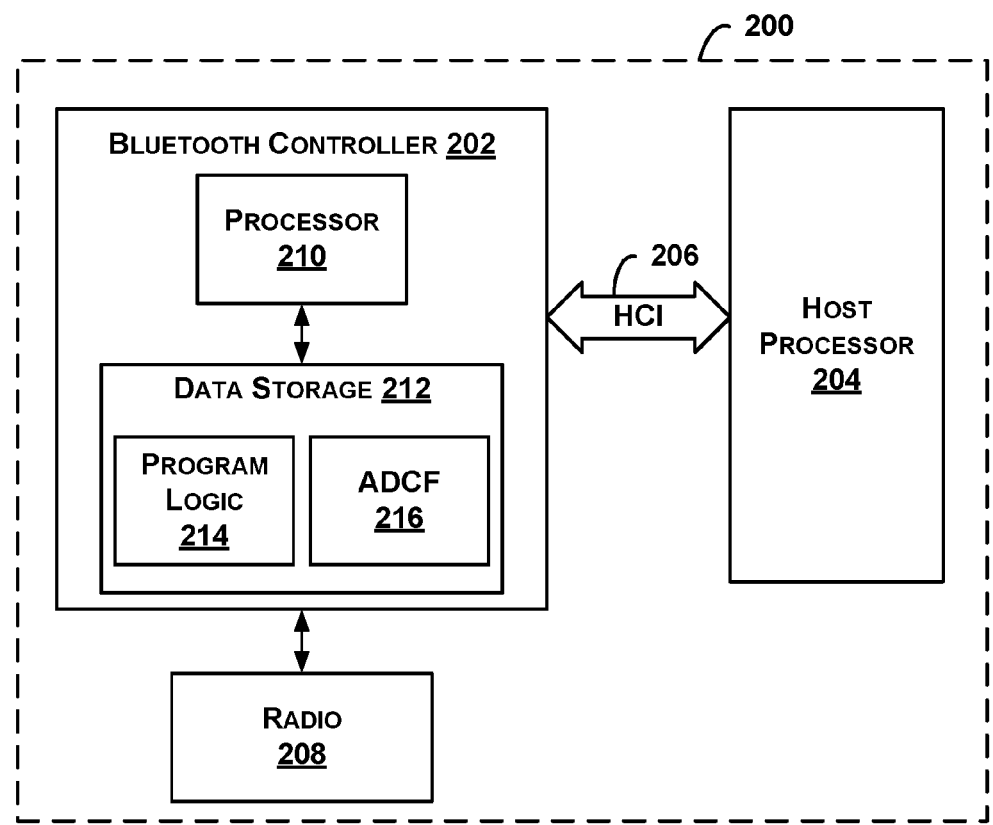
FIG. 2 illustrates a schematic drawing of an example computing device.

FIG. 2 illustrates a schematic drawing of an example computing device 200. In some instances, computing device 200 may, for example, take the form of any computing device described above in relation to FIG. 1 or a similar device that may be configured to perform the methods and functions described herein. In this example, computing device 200 includes a Bluetooth controller 202 configured to communicate with a host processor 204 via a host-controller interface (HCI) 206. Further, the computing device 200 includes a radio 208.

The Bluetooth controller 202 can be any suitable logic, circuitry, interfaces, and/or code that facilitates transmission and/or receiving signals over a BLE air interface. For instance, the signals may include advertising packets, scan request packets, or scan response packets transmitted or received over one or more advertising channels. By way of example, Bluetooth controller 202 includes a processor 210 and data storage 212. Processor 210 may be a baseband processor, for instance, and can include one or more central processing units (CPUs), such as one or more general purpose processors and/or one or more dedicated processors (e.g., application specific integrated circuits, digital signal processors, network processors, etc.). Further, processor 210 may execute firmware associated with operation of the Bluetooth controller 202 for managing and/or providing support for link management functionality for the Bluetooth controller 202. Firmware executed by the processor 210 can also facilitate communication with the host processor 204 via the HCI 206. In some instances, the Bluetooth controller 202 may be a Bluetooth module or BLE module of a device.

Data storage 212, in turn, may include volatile and/or non-volatile data storage and can be integrated in whole or in part with processor 210. Data storage 212 can hold program logic 214 executable by processor 210, and data that may be manipulated to carry out the various methods, processes, or functions described herein. Alternatively, these methods, processors, or functions can be defined by hardware, firmware, and/or any combination of hardware, firmware, and software. By way of example, the program logic 214 may include program instructions, perhaps stored on a non-transitory, computer-readable medium, executable by the processor 210 to carry out any of the methods, processes, or functions disclosed in this specification or the accompanying drawings. In line with the discussion above, data storage 212 may further include an advertising data content filter 216 that includes data which may be maintained and utilized by the Bluetooth controller 202 to filter and report data packets to the host processor 204.

Host processor 204 may include one or more central processing units (CPUs), such as one or more general purpose processors and/or one or more dedicated processors (e.g., application specific integrated circuits, digital signal processors, network processors, etc.). In one example, host processor 204 may be configured to implement one or more upper layers of a Bluetooth stack in accordance with the BLE protocol. As described herein, the upper layers of the Bluetooth stack (e.g., L2CAP, RFCOMM, OBEX, and selected profiles) may be referred to as the host Bluetooth stack or Bluetooth host stack. In some instances, host processor 204 may be a main application processor of the computing device 200, for instance, and may implement the host Bluetooth stack. Alternatively, the host processor 204 or the processor 210 may be omitted, and functions of the host Bluetooth stack and the Bluetooth controller may be implemented by a single processor of multi-processor core (not shown).

The HCI 206 may be implemented using one or more of several different hardware interfaces, such as universal synchronous receiver/transmitter (UART), serial peripheral interface bus (SPI), universal serial bus (USB) interface, peripheral component interconnect (PCI), or any other suitable hardware interface.

The radio 208 may be a receiver or transceiver that includes suitable logic and/or circuitry to facilitate transmission and/or receiving of wireless signals in accordance with the BLE protocol or any related advertising protocols.

In some embodiments, the computing device 200 may include a device platform or operating system (not shown). The device platform or the operating system may be compatible with Bluetooth or BLE protocols, or other short-range wireless communication protocols. Additionally, in some instances, the device platform or the operating system may be configured as a multi-layered Linux platform or operating system. The device platform may include different applications and an application framework, as well as various kernels, libraries, and runtime entities. In other examples, other formats or systems may operate the computing device 200 as well.

Figure 3:
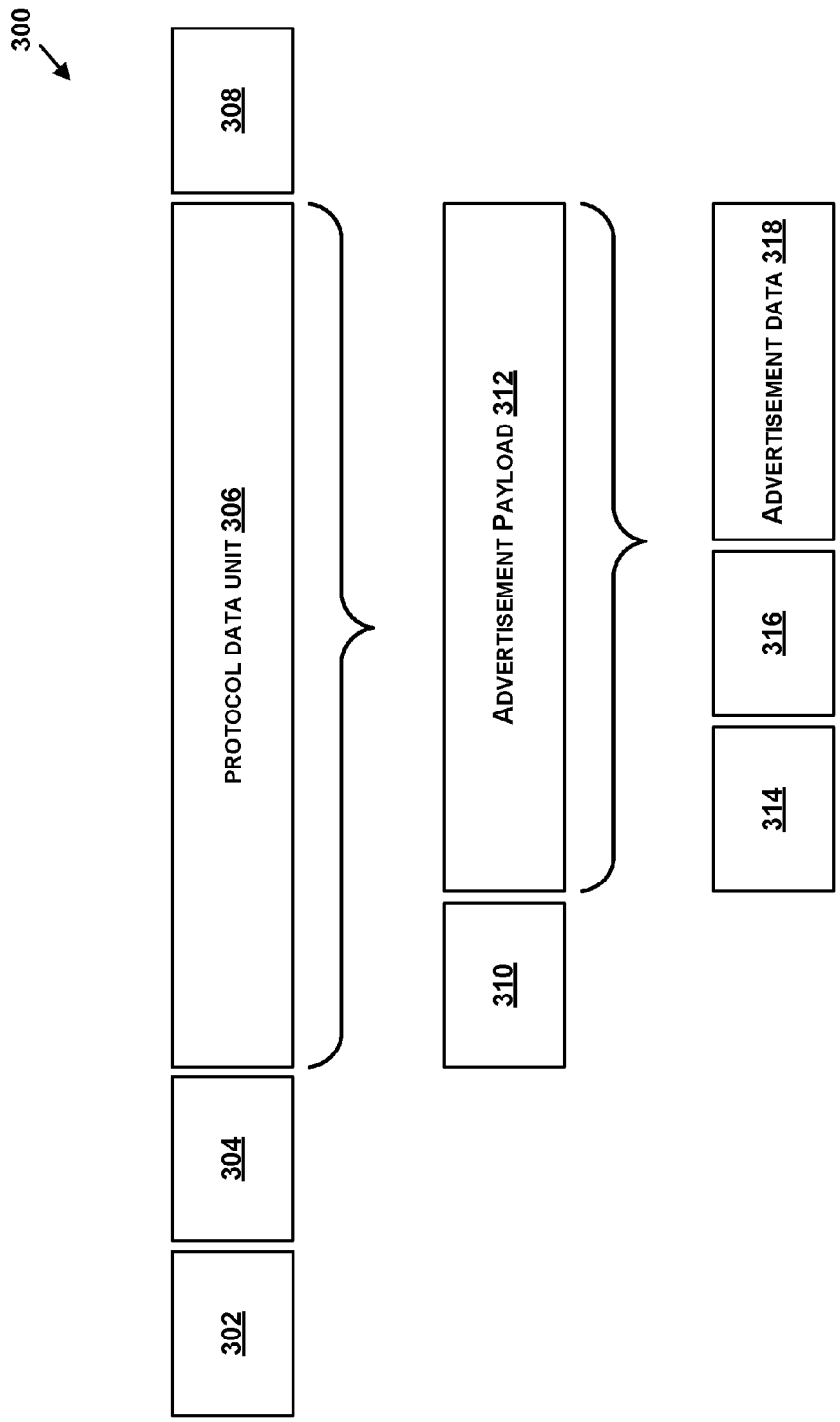
FIG. 3 illustrates an example data packet structure.

In line with the discussion above, in some examples, computing device may receive one or more data packets, such as an advertising packet and/or scan response packet, from an advertising Bluetooth device. FIG. 3 illustrates an example data packet structure 300. In particular, data packet structure 300, may, for example, represent the form of any data packets described above in relation to FIGS. 1 and 2, such as an advertisement packet or a scan response packet.

As shown in FIG. 3, a data packet may include preamble 302, access address 304, protocol data unit 306 with two to thirty-nine bytes, and error checking data 308. Protocol data unit 306 may, in turn, include header 310 and a variable-size advertisement payload 312. Further, advertisement payload 312 may include header 314, device identifier 316, and advertisement data 318.

Device identifier 316 may include an address of the advertising device that transmitted the data packet. In other words, device identifier 316 may be a broadcaster address. For instance, the broadcaster address may be a MAC address or other unique device identifier.

Advertisement data 320 may include various types of data defined according to the BLE standard. For instance, advertisement data 320 may include one or any combination of: a service universally unique identifier (UUID), a service solicitation UUID, a local name, manufacturer specific data, and service data. A service UUID or service solicitation UUID may identify one or more service types associated with an advertiser (e.g., temperature data, promotional information, health information, location information, etc.). Accordingly, a service UUID or service solicitation UUID may function to let other devices know which services are provided by an advertiser. Further service data may be the data corresponding to the service. For instance, if the service type is temperature, the service data may be a temperature reading. A local name may be a partial or complete user-readable local name that is a UTF-8 encoded string. Manufacturer specific data may include a company identifier as well as any other type of data defined according to a format specified by the identified company.

Figure 4:
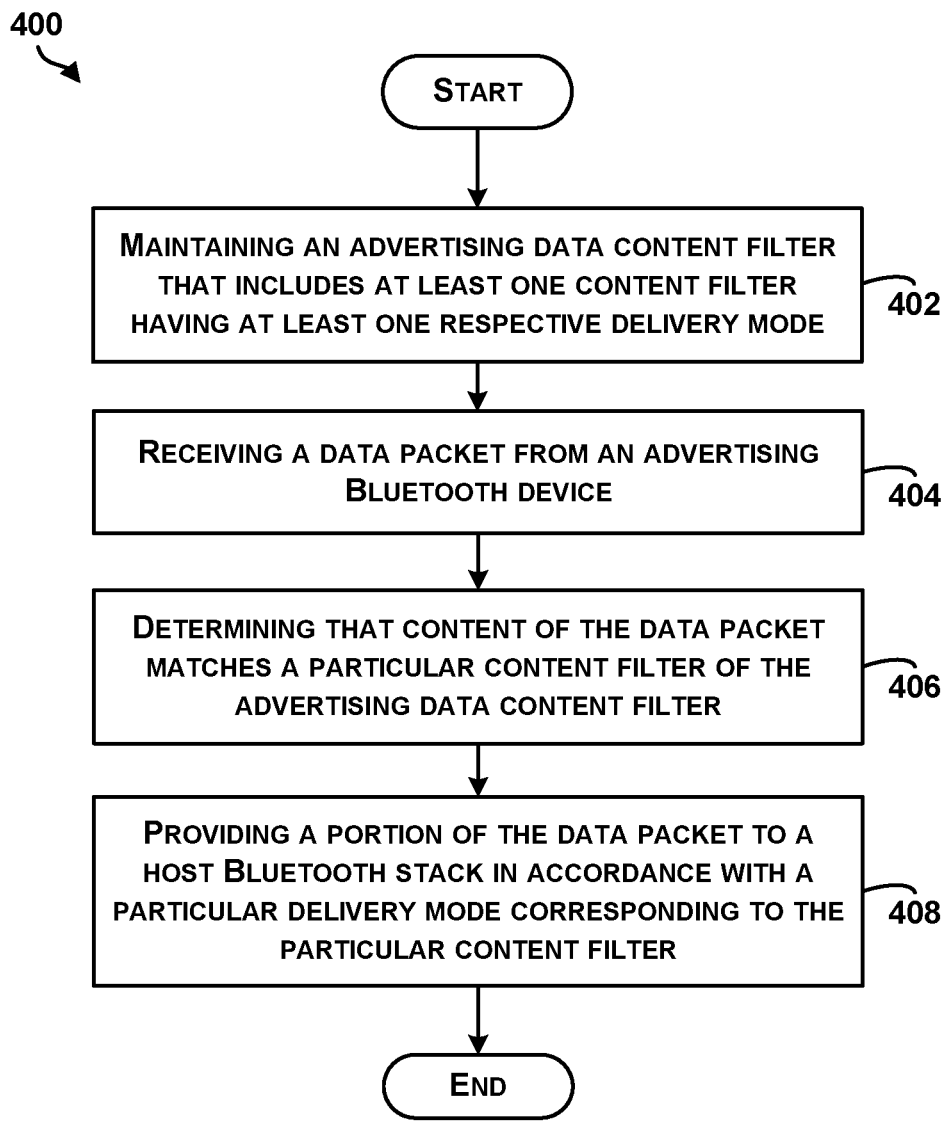
FIG. 4 is a block diagram of an example method for filtering a data packet.

Referring now to FIG. 4, FIG. 4 is a block diagram of an example method 400 for filtering data packets. Method 400 shown in FIG. 4 presents an embodiment of a method that could be performed by the computing device 100 of FIG. 1, for example, or by any computing device. More specifically, method 400 presents an embodiment that could be performed by one or more processors of a Bluetooth controller of a computing device and/or one or more application processors of a computing device. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

Initially, at block 402, the method 400 includes maintaining an advertising data content filter that includes at least one content filter having at least one respective delivery mode. By way of example, a Bluetooth controller of a computing device may maintain the advertising data content filter in a memory of the Bluetooth controller. Further, each of one or more content filters of the advertising data content filter may have a delivery mode that specifies when to deliver data packets matching the content filter to a host Bluetooth stack of the computing device.

As one example, the advertising data content filter may include a particular content filter that specifies when to deliver a data packet that matches a particular broadcaster address to a host processor which implements the host Bluetooth stack. In some instances, the particular content filter may include multiple broadcaster addresses, and a Bluetooth controller that maintains the advertising data content filter may be configured to determine whether a broadcaster address contained within a received data packet matches with any of the broadcaster addresses of the multiple broadcaster addresses.

As another example, the advertising data content filter may include a particular content filter that specifies when to deliver a data packet that matches a particular service UUID or multiple particular service UUIDs to the host Bluetooth stack. Similarly, the advertising data content filter may include a particular content filter that specifies when to deliver a data packet that matches a particular service solicitation UUID or one of multiple particular service solicitation UUIDs to the host Bluetooth stack. As still another example, the advertising data content filter may include a particular content filter that specifies when to deliver a data packet having a local name that matches a particular local name to the host Bluetooth stack. As yet another example, the advertising data content filter may include a particular content filter that specifies when to deliver a data packet having a portion of manufacturer specific data that matches a particular portion of manufacturer specific data to the host Bluetooth stack. As yet another example, the advertising data content filter may include a particular content filter that specifies when to deliver a data packet having service data that matches particular service data to the host Bluetooth stack.

Furthermore, in some instances, a content filter may be configured to allow the Bluetooth controller to filter on multiple features of a received data packet. For instance, the advertising data packet content filter may include a particular content filter having a local name filter and a manufacturer specific data filter. In such an instance, the Bluetooth controller may be configured to determine whether a local name of a received data packet matches a particular local name and/or whether the manufacturer specific data of a received data packet matches a particular instance of manufacturer specific data. In other words, a particular content filter may be configured to cause a Bluetooth controller to filter a received data packet using multiple portions or fields of the received data packet.

Additionally, in some instances, a content filter may also include an RSSI threshold used to filter received data packets. By way of example, a particular content filter may be configured with an RSSI threshold with which a Bluetooth controller compares the RSSI of a received data packet. In one implementation, if the RSSI of a received data packet is below the RSSI threshold, the Bluetooth controller may ignore the data packet. But if the RSSI of the received data packet is above the RSSI threshold, the Bluetooth controller may proceed to filter the received data packet depending on content of the received data packet.

As discussed above, each particular content filter of the advertising data content filter may correspond with a respective delivery mode. For instance, a first content filter may correspond to a first delivery mode and a second content filter may correspond to a second delivery mode. In this scenario, if content of a received data packet matches the first content filter, the received data packet (or a portion of the received data packet) may be provided to the host Bluetooth stack in accordance with the first delivery mode.

Additionally or alternatively, if content of the received data packet matches the second content filter, the received data packet (or a portion of the received data packet) may be provided to the host Bluetooth stack in accordance with the second delivery mode. Note that in some instances, content of a received data packet may match both a first content filter and a second content filter that may have either the same or different delivery modes. In this scenario, the received data packet (or a portion of the received data packet) may be provided to the host Bluetooth stack in accordance with both of the respective delivery modes.

Multiple different types of delivery modes are contemplated. For instance, one example of a delivery mode is an immediate delivery mode in which a received data packet is subsequently delivered to the host Bluetooth stack in response to determining that the data packet matches a corresponding content filter. By way of example, if a host processor which implements the host Bluetooth stack is in an idle or sleep mode, and the Bluetooth controller receives data packet that matches a particular content filter, the Bluetooth controller may wake up the host processor and delivery the data packet to the host Bluetooth stack. Note that the Bluetooth controller may also deliver data packets to the host processor in the immediate delivery mode if the host processor is in an active state.

Another example of a delivery mode is a batching delivery mode in which a received data packet is subsequently stored in a memory of the Bluetooth controller in response to determining that the data packet matches a corresponding content filter. By way of example, if a host processor which implements the host Bluetooth stack is in an idle or sleep mode, and the Bluetooth controller receives a particular content filter, the Bluetooth controller may store the received data packet in a memory of the Bluetooth controller, rather than immediately providing the data packet to the host processor and waking up the host processor. For instance, the Bluetooth controller may store the data packet in a memory until the host processor independently wakes up and requests data packets from the Bluetooth controller. Or the Bluetooth controller may store the data packet in a memory for a predetermined time period, or perhaps until the memory is full. Once the predetermined time period has expired or the memory is full, the Bluetooth controller may then provide any data packets stored in the memory to the host processor. Advantageously, the batching delivery mode may allow the host processor to remain in a sleep or idle state, thereby conserving power and reducing communication between the Bluetooth controller and host processor.

Another example of a delivery mode is a verification delivery mode in which a received data packet that matches a corresponding content filter is provided to the host Bluetooth stack upon expiration of a timer and verification of a presence of an advertising device. For instance, in one implementation of a verification delivery mode, if a Bluetooth controller determines that a received data packet matches a particular content filter, the Bluetooth controller may then start a timer. By way of example, the timer may run for a predetermined amount of milliseconds (e.g., 5, 50, 500, etc.) or perhaps a few seconds. While the timer is running, the Bluetooth controller may continue to monitor data packets received from an advertising Bluetooth device that sent the data packet to confirm that the advertising Bluetooth device is still in range of the computing device.

Once the timer expires, the Bluetooth controller may then deliver the data packet to the host Bluetooth stack if the advertising Bluetooth device is still transmitting data packets that match the particular content filter and the computing device is still in range of the advertising Bluetooth device. On the other hand, if the computing device is no longer in range of the advertising Bluetooth device when the timer expires, or if the advertising Bluetooth device is no longer transmitting data packets that match the particular content filter, the Bluetooth controller may forego delivering the data packet to the host Bluetooth stack. Thus, the verification delivery mode may enable a Bluetooth controller to confirm and verify the presence of an advertising Bluetooth device prior to informing the host Bluetooth stack that the Bluetooth controller has received a data packet from the advertising Bluetooth device. Other implementations of verification delivery modes are also contemplated, as described below with reference to FIG. 7, for instance.

In some instances, the host Bluetooth stack may configure parameters of the advertising data content filter by communicating with the Bluetooth controller. For instance, the host Bluetooth stack may provide one or more commands to the Bluetooth controller that cause the Bluetooth controller to configure the advertising data content filter. As one example, the host Bluetooth stack may use predetermined operating codes to cause the Bluetooth controller to configure the advertising data content filter.

For instance, to setup the advertising data content filter, a host Bluetooth stack may provide an "ADCF_enable" operating code to the Bluetooth controller to enable the advertising data content filter. In response to receiving the "ADCF_enable" code, the Bluetooth controller may enable the advertising data content filter and respond with a command complete status operating code. Further, to add a particular content filter, the host Bluetooth stack may provide an "ADCF_add" operating code and an "ADCF_filter_index" operating code to the Bluetooth controller. In conjunction with the "ADCF_add" operating code and "ADCF_filter_index" operating code, the host Bluetooth stack may also specify an "ADCF_feature_selection" that specifies what portion(s) of a data packet to filter on. For instance, the host Bluetooth stack may choose to filter on one or more of: broadcaster address, service UUID, service solicitation UUID, local name, manufacturer specific data, and service data.

By way of example, to filter on broadcaster address, the host Bluetooth stack may provide an "ADCF_broadcaster address" operating code along with a 6-byte broadcaster address. Similarly, to filter on a service UUID, the host Bluetooth stack may provide an "ADCF_UUID" operating code along with a 16-bit, 32-bit, or 128-bit service UUID. To filter on a service solicitation UUID, the host Bluetooth stack may provide an "ADCF_solicitation_UUID" operating code along with a 16-bit, 32-bit, or 128-bit service solicitation UUID. In a similar manner, to filter on a local name, manufacturer specific data, or service data, the host Bluetooth stack may provide an operating code along with a local name string, manufacturer specific data string, or service data string.

If a host Bluetooth stack specifies multiple possible entries for a particular feature (e.g., multiple broadcaster addresses, multiple UUIDs, multiple local names, etc.), the host Bluetooth stack may also specify what type of logic (e.g., "OR" or "AND") to use for the multiple entries within a particular list of features. As an example, the host Bluetooth stack may provide an operating code that specifies to use "OR" logic between a list of multiple broadcaster addresses. In this configuration, the Bluetooth controller may determine whether a broadcaster address of a received data packet matches any of the multiple broadcaster addresses.

Likewise, if a particular content filter includes multiple features, the host Bluetooth stack may also specify a corresponding logic operation to use between the multiple features. That is, the host Bluetooth stack may provide an "ADCF_logic_type" operating code that specifies whether to use "OR" or "AND" logic for the multiple features of the particular content filter.

Further, the host Bluetooth stack may also provide a "delivery_mode" operating code that specifies a particular delivery mode corresponding to each content filter. For instance, the host Bluetooth stack may select from an immediate mode, batched mode, or verification mode. If the delivery mode is a verification mode, the host Bluetooth stack may also provide one or more operating codes to specify parameters of the verification mode, such as a timeout duration, and perhaps a timeout count and/or RSSI threshold.

To configure another content filter, the host Bluetooth stack may change the "ADCF_filter_index" and provide the appropriate parameters. The host Bluetooth stack may also choose to combine two particular content filters together by specifying that the logic type for a first content filter and a second content filter should be "AND". In such a configuration, the Bluetooth controller may filter for received data packets that match both the first content filter and the second content filter.

The host Bluetooth stack may also use "delete" and/or "clear" operating codes to delete particular feature selections or clear an entire advertising packet content filter. Optionally, the host Bluetooth stack may also configure one or more RSSI threshold for the advertising data content filter. RSSI thresholds may enable a host Bluetooth stack to control when data packets are "visible" for filter processing. For instance, the host Bluetooth stack may provide an operating code that specifies an RSSI high threshold (e.g., −50 dBm) or range of RSSI thresholds (e.g., high and low thresholds). In one example implementation, if an RSSI high threshold is configured, the Bluetooth controller may be configured to determine whether an RSSI of a received data packet is above the RSSI threshold. If the RSSI is above the RSSI threshold, the Bluetooth controller may filter the data packet using the advertising data content filter. But if the RSSI of the received data packet is below the RSSI threshold, the Bluetooth controller may ignore the received data packet. Similarly, if a range of RSSI thresholds are configured, the Bluetooth controller may be configured to determine whether an RSSI of a received data packet falls within or outside of an RSSI range.

Continuing with the description of FIG. 4, at block 404, the method 400 includes receiving a data packet from an advertising Bluetooth device. In line with the discussion above, the data packet may be an advertising packet or a scan response packet provided in an advertising channel. For instance, a Bluetooth controller may receive the data packet over a BLE air-interface using a radio of a computing device.

At block 406, the method 400 includes determining that content of the data packet matches a particular content filter of the advertising data content filter. By way of example, in response to receiving the data packet, a Bluetooth controller may compare content of the received data packet to one or more content filters of the advertising data content filter. As a result of the comparison, the Bluetooth controller may determine that content of the received data packet matches a particular content filter of the advertising data content filter. For instance, a particular content filter of the advertising data content filter may be configured to filter for a local name of "Advertising Device XYZ". If the content of the received data packet indicates that the local name is "Advertising Device XYZ", the Bluetooth controller may determine that content of the data packet matches the particular content filter.

And at block 408, the method 400 includes providing a portion of the data packet to a host Bluetooth stack of the computing device in accordance with a particular delivery mode corresponding to the particular content filter. Continuing with the example from above, if the particular content filter that is configured to filter on a local name field corresponds to an immediate delivery mode, the Bluetooth controller may responsively provide at least a portion of the received data packet to the host Bluetooth stack. By way of example, the Bluetooth controller may provide advertisement data of the data packet to the host Bluetooth stack using an HCI. On the other hand, if the particular content filter to which the content of the data packet matches corresponds to a batching delivery mode, the Bluetooth controller may store the received data packet in a memory until the memory is full or the host Bluetooth stack provides a request to read the memory. When the memory is full or the Bluetooth controller receives a read request, the Bluetooth controller may then provide at least a portion of the received data packet to the host Bluetooth stack.

As discussed above, in some instances, the Bluetooth controller may receive and filter data packets while a host processor which implements the host Bluetooth stack is in an idle more or a sleep mode. In other words, the Bluetooth controller may be configured to perform the functions described above with reference to blocks 404 and 406 while the host processor is in a sleep or idle mode.

In some examples, the method 400 may also include determining that content of the received data packet matches a second content filter of the advertising data content filter, and providing at least a portion of the data packet to the host Bluetooth stack in accordance with a second delivery mode corresponding to the second content filter. For example, the second content filter may be configured to filter on a manufacturer specific data field of the received data packet. And if the manufacturer specific data of the received data packet matches the second content filter, the Bluetooth controller may responsively provide the received data packet to the host Bluetooth stack in accordance with the second delivery mode.

In one example, the Bluetooth controller may be configured to determine whether content of the received data packet matches a plurality of content filters in serial order. For instance, the Bluetooth controller may first determine whether content of the received data packet matches a first content filter. Then the Bluetooth controller may determine whether content of the received data packet matches a second content filter, and so forth. In some instances, it is possible that when a data packet is received, the data packet may cause immediate reporting based on a delivery mode corresponding to a first content filter that content of the received data packet matches as well as batching of the data packet due to a delivery mode corresponding to a second content filter that content of the received data packet matches.

Referring now to FIG. 5, FIG. 5 is a table 500 of example content filters. More specifically, FIG. 5 illustrates an example of a plurality of content filters, indexed from 1-8, that may be maintained by a Bluetooth controller within an advertising data content filter. Each of the plurality of content filters includes one or more feature selections that identify one or more fields of received data packets to filter on. For instance, a first content filter, identified by filter index 1, may be configured to filter on a broadcaster address. Further, a second content filter, identified by filter index 2, may be configured to filter on a local name. Still further, a third content filter, identified by filter index 3, may be configured to filter on a service UUID.

As discussed above, in some instances, a particular content filter may be configured to filter on multiple different fields of a received data packet. For instance, a fifth content filter, identified by filter index 5, may be configured to filter on both a local name filed and a manufacturer specific data field. Note that the logic type for the fifth content filter, identified by the value within the last column of table 500, indicates the desired combination logic to use for the fifth content filter. In particular, since the logic type for the fifth content filter is configured as "OR", the Bluetooth controller may be configured to determine whether (1) the local name content of a data packet matches the local name string of the fifth content filter, or (2) the manufacturer specific data of the data packet matches the manufacturer specific data string of the fifth content filter. If either of these conditions holds, the Bluetooth controller may provide the data packet to the host Bluetooth stack in accordance with a delivery mode corresponding to the fifth content filter.

Conversely, the logic type for a seventh content filter, identified by filter index 7, is "AND". Therefore, if (1) the manufacturer specific data of a received data packet matches the manufacturer specific data string of the seventh content filter, and (2) the service data string of the received data packet matches the service data string of the seventh content filter, the Bluetooth controller may provide the data packet to the host Bluetooth stack in accordance with a delivery mode corresponding to the seventh content filter. But if both of these conditions are not met, the received data packet may not trigger reporting to the host Bluetooth stack in accordance with the delivery mode corresponding to the seventh content filter.

Figure 6:
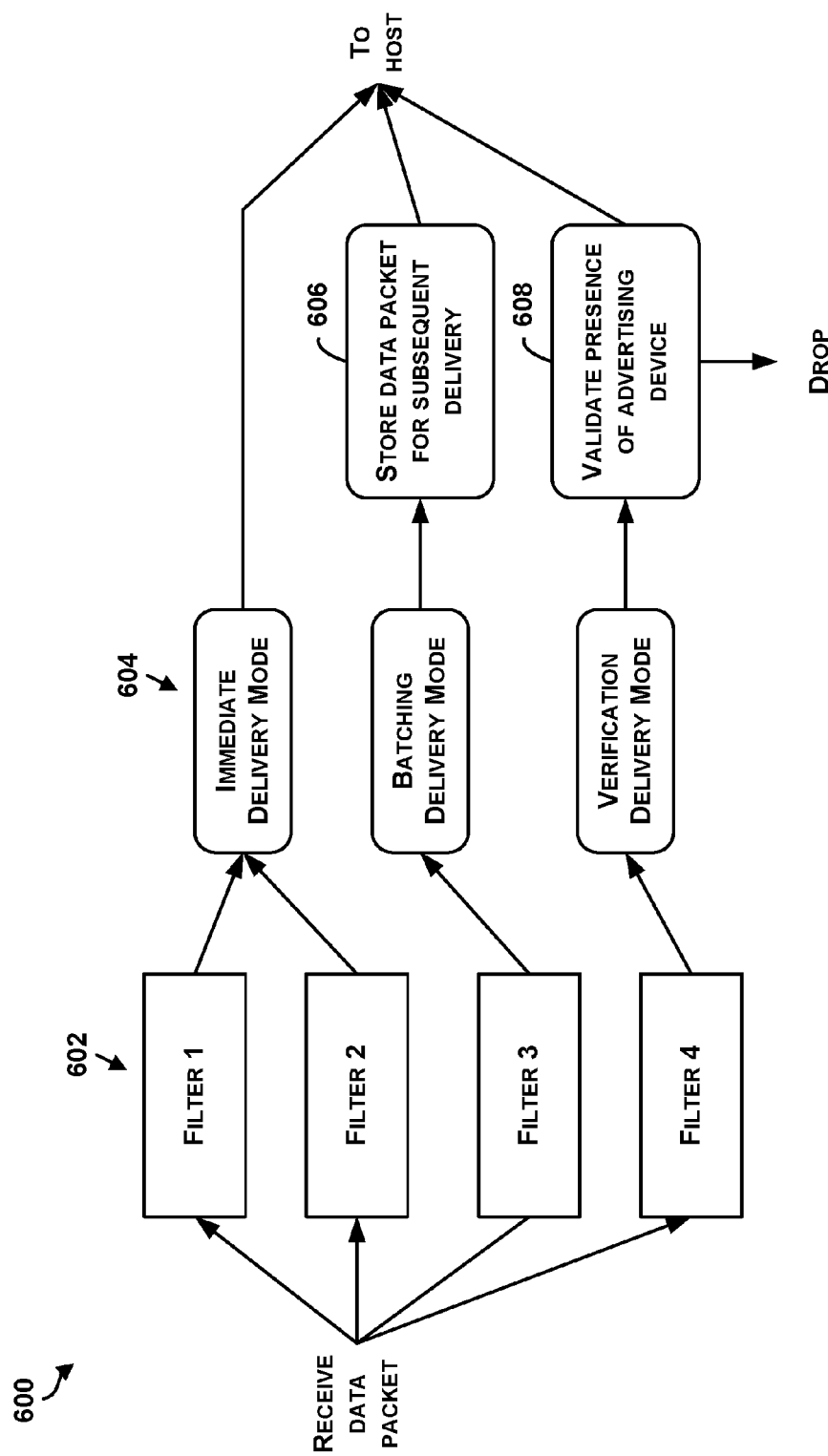
FIG. 6 is a conceptual illustration of an example advertising data content filter.

FIG. 6 is a conceptual illustration of an example advertising data content filter 600. As shown in FIG. 6, the advertising data content filter 600 includes a plurality of content filters 602 and a plurality of delivery modes 604. In line with the discussion above, a Bluetooth controller may be configured to use the advertising data content filter 600 to filter received data packets, such as advertising packets or scan response packets. By way of example, upon receiving a data packet, the Bluetooth controller may determine content of the data packet, and then compare the content of the data packet to each of the plurality of content filters 602. If content of the data packet matches a first content filter or a second content filter, the Bluetooth controller may provide the data packet or a portion of the data packet to the host Bluetooth stack using an immediate delivery mode.

Additionally or alternatively, if content of the received data packet matches a third content filter, the Bluetooth controller may provide the data packet to the host Bluetooth stack using a batching delivery mode. For instance, as shown at block 606, the Bluetooth controller may store the data packet or a portion of the data packet for subsequent delivery (e.g., after expiration of a timer, upon request from the host Bluetooth stack, when a memory is full, etc.) to the host Bluetooth stack.

Furthermore, if content of the received data packet matches a fourth content filter, the Bluetooth controller may provide the data packet to the host Bluetooth stack using a verification delivery mode. For instance, as shown at block 608, the Bluetooth controller may validate the presence of an advertising device during a timeout period. Depending on the result of the validation, the Bluetooth controller may either drop (i.e., ignore) the received data packet or provide the data packet or a portion of the data packet to the host Bluetooth stack.

Figure 7:
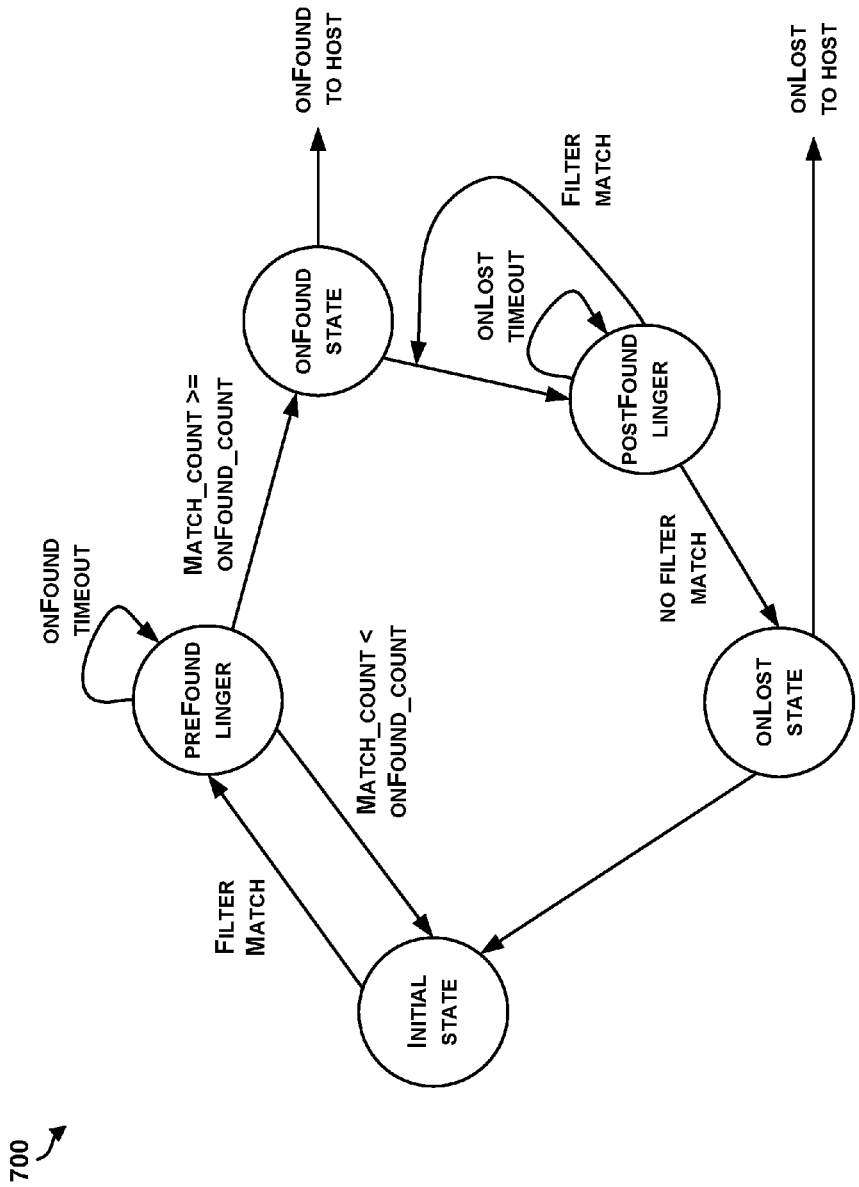
FIG. 7 is a conceptual illustration of an example delivery mode.

For instance, FIG. 7 is a conceptual illustration 700 of an example verification delivery mode. More specifically, FIG. 7 illustrates two different examples of verification delivery modes: an onFound delivery mode and an onLost delivery mode. If the Bluetooth controller is configured to use an onFound delivery mode for data packets matching a particular content filter, the Bluetooth controller may provide the data packets to the host Bluetooth stack upon reaching the onFound state. And if the Bluetooth controller is configured to use an onLost delivery mode for data packets matching a particular content filter, the Bluetooth controller may provide the data packets to the host Bluetooth stack upon reaching the onLost state.

The onFound delivery mode and onLost delivery mode may be more readily understood by studying the flow between the various states depicted in FIG. 7. For example, if a Bluetooth controller determines that content of data packet received from an advertising device matches a content filter, the Bluetooth controller may start an onFound timer. This is illustrated by the arrow from the initial state to the preFound linger state.

While the onFound timer is running, the Bluetooth controller may continue to receive data packets from the advertising device. Each time that the Bluetooth controller receives another data packet from the advertising device while the onFound timer is running, the Bluetooth controller may increment a match_count. After expiration of the onFound timer, the Bluetooth controller may determine whether the match_count is greater than a match_count threshold. If the match_count is greater than the threshold, the Bluetooth controller will consider the advertising device to be "Found". This is illustrated by the arrow from the preFound linger state to the onFound state. On the other hand, if the match_count is less than the threshold, the Bluetooth controller may ignore the received data packet(s). This is illustrated by the arrow from the preFound linger state to the initial state.

After a received data packet causes the Bluetooth controller to reach the onFound state, the Bluetooth controller may start an onLost timer. This is illustrated by the arrow from the onFound state to the postFound linger state. After expiration of the onLost timer, the Bluetooth controller may determine whether any additional data packets were received from the advertising device while the onLost timer was running. If one or more data packets were received from the advertising device, the Bluetooth controller may restart the onLost timer. However, if the Bluetooth controller did not receive any more data packets from the advertising device during the onLost timeout period, the Bluetooth controller may consider the advertising device to have been "Lost". This is illustrated by the arrow from the postFound linger state to the onLost state.

Thus, the host Bluetooth stack may configure the Bluetooth controller to use an onFound delivery mode if the host Bluetooth stack wishes to receive data packets after the presence of an advertising device has been verified. Further, the host Bluetooth stack may configure the Bluetooth controller to use an onLost deliver mode if the host Bluetooth stack wishes to receive data packets after the presence of an advertising device has been verified but the advertising device is no longer within range or providing any additional data packets.

To implement either the onFound delivery mode or the onLost delivery mode, the host Bluetooth stack may configure a few parameters, such as an onFound timeout period, a match count threshold, and an onLost timeout period. In practice the onFound timeout period and onLost timeout period may be a number of milliseconds, or perhaps a few seconds.

Figure 8:
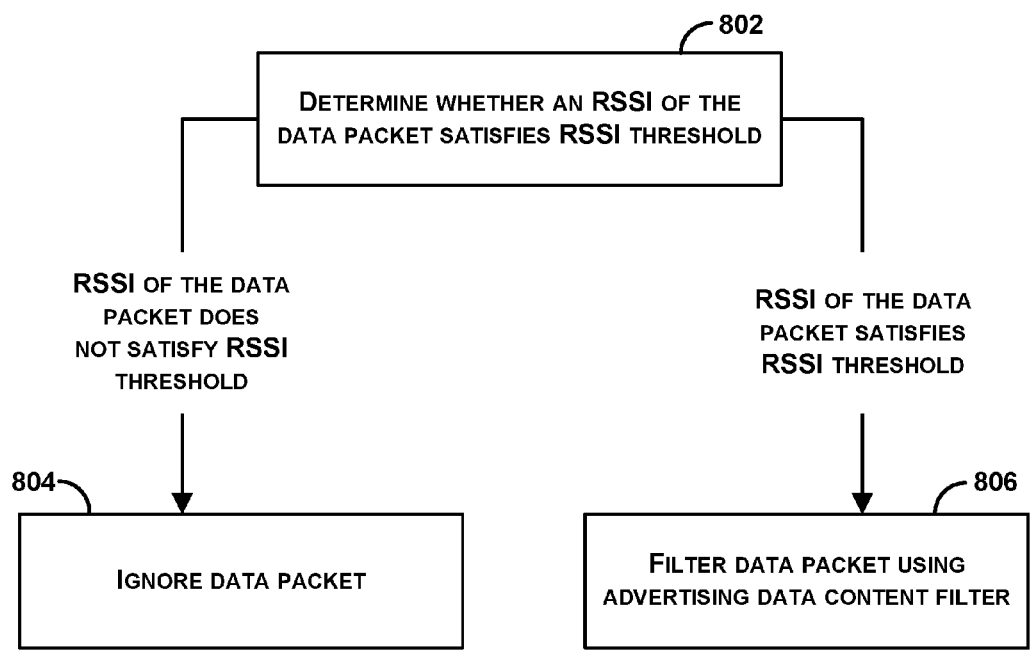
FIG. 8 is a flow chart depicting example functions that can be carried out in accordance with the present disclosure.

Referring now to FIG. 8, FIG. 8 is a flow chart depicting example functions that can be carried out in accordance with the present disclosure. As shown in FIG. 8, at block 802 a Bluetooth controller may determine whether an RSSI of the data packet satisfies an RSSI threshold. If the RSSI of the data packet does not satisfy the RSSI threshold, then, at block 804, the Bluetooth controller may ignore the data packet. But if the RSSI of the data packet does satisfy the RSSI threshold, then, at block 806, the Bluetooth controller may filter the data packet using the advertising data content filter.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
maintaining, by a short-range wireless device, multiple advertising data content filters and each advertising data content filter being associated with a corresponding application operating on the short-range wireless device, wherein each advertising data content filter comprises at least one content filter having at least one respective delivery mode that specifies when to deliver data packets matching the at least one content filter to a host stack for the corresponding application;
receiving, by the short-range wireless device, a data packet from an advertising short-range wireless device;
determining, by the short-range wireless device, that content of the data packet matches a particular content filter of the multiple advertising data content filters; and
based on the content of the data packet matching the particular content filter of the advertising data content filters, delivering a portion of the data packet to the host stack in accordance with a particular delivery mode corresponding to the particular content filter for the corresponding application.

2. The method of claim 1, further comprising:
receiving one or more commands for configuring parameters of each advertising data content filter; and
configuring the parameters of each advertising content packet filter based on the one or more commands.

3. The method of claim 1, wherein the at least one content filter for each advertising data content filter is selected from the group consisting of: a broadcaster address filter; a service universally unique identifier (UUID) filter; a service solicitation UUID filter; a local name filter; a manufacturer data filter; and a service data filter.

4. The method of claim 1, wherein the data packet comprises an advertising packet.

5. The method of claim 1, wherein the data packet comprises a scan response packet.

6. The method of claim 1, wherein the at least one respective delivery mode comprises an immediate delivery mode wherein the portion of the data packet is immediately delivered to the host stack.

7. The method of claim 1, wherein the at least one respective delivery mode comprises a batching mode wherein the portion of the data packet is stored in a memory of a short-range wireless controller.

8. The method of claim 1, wherein the at least one respective delivery mode comprises a verification mode wherein the portion of the data packet is delivered to the host stack upon expiration of a timeout period and verification of a presence of the advertising short-range wireless device.

9. The method of claim 1, wherein at least one advertising data content filter associated with a corresponding application operating on the short-range wireless device further comprises a configurable received signal strength indication (RSSI) threshold, and wherein the method further comprises:
determining whether an RSSI of the data packet satisfies the RSSI threshold; and
if the RSSI of the data packet satisfies the RSSI threshold, filtering the data packet using the advertising data content filter, but if the RSSI of the data packet does not satisfy the RSSI threshold, then ignoring the data packet.

10. The method of claim 1, wherein the host stack is implemented by a host processor of the short-range wireless device, and wherein receiving the data packet and determining that content of the data packet matches the particular content filter of the multiple advertising data content filters are carried out by a short-range wireless controller of the short-range wireless device while the host processor of the short-range wireless device is in an idle mode or sleep mode.

11. The method of claim 1, wherein each advertising data content filter is configurable using a plurality of predetermined operating codes.

12. A short-range wireless device comprising:
one or more processors; and
a non-transitory computer-readable medium, configured to store instructions, that when executed by the one or more processors, cause the short-range wireless device to perform functions comprising:
maintaining multiple advertising data content filters and each advertising data content filter being associated with a corresponding application operating on the short-range wireless device, wherein each advertising data content filter comprises at least one content filter having at least one respective delivery mode that specifies when to deliver data packets matching the at least one content filter to a host stack for the corresponding application;
receiving a data packet from an advertising short-range wireless device;
determining that content of the data packet matches a particular content filter of the multiple advertising data content filters; and
based on the content of the data packet matching the particular content filter of the advertising data content filters, delivering a portion of the data packet to the host stack in accordance with a particular delivery mode corresponding to the particular content filter for the corresponding application.

13. The device of claim 12, wherein the at least one content filter for each advertising data content filter is selected from the group consisting of: a broadcaster address filter; a service universally unique identifier (UUID) filter; a service solicitation UUID filter; a local name filter; a manufacturer data filter; and a service data filter.

14. The device of claim 12, wherein the data packet comprises an advertising packet.

15. The device of claim 12, wherein the data packet comprises a scan response packet.

16. The device of claim 12, wherein the at least one respective delivery mode comprises an immediate delivery mode wherein the portion of the data packet is immediately delivered to the host stack.

17. The device of claim 12, wherein the at least one respective delivery mode comprises a batching mode wherein the portion of the data packet is stored in a memory of a short-range wireless controller.

18. The device of claim 12, wherein the at least one respective delivery mode comprises a verification mode wherein the portion of the data packet is delivered to the host stack upon expiration of a timeout period and verification of a presence of the advertising short-range wireless device.

19. A non-transitory computer-readable medium having stored therein instructions, that when executed by one or more processors of a short-range wireless device, cause the short-range wireless device to perform functions comprising:
maintaining multiple advertising data content filters and each advertising data content filter being associated with a corresponding application operating on the short-range wireless device, wherein each advertising data content filter comprises at least one content filter having at least one respective delivery mode that specifies when to deliver data packets matching the at least one content filter to a host stack for the corresponding application;
receiving a data packet from an advertising short-range wireless device;
determining that content of the data packet matches a particular content filter of the multiple advertising data content filters; and
based on the content of the data packet matching the particular content filter of the advertising data content filters, delivering a portion of the data packet to the host stack in accordance with a particular delivery mode corresponding to the particular content filter for the corresponding application.

20. The non-transitory computer-readable medium of claim 17, wherein the functions further comprise determining whether to immediately deliver providing a portion of the data packet to the host stack, store the portion of the data packet in a memory of the short-range wireless device, or deliver the portion of the data packet to the host stack upon expiration of a timeout period and verification of a presence of the advertising short-range wireless device, in accordance with the at least one respective delivery mode corresponding to the content filter for the corresponding application.

* * * * *